United States Patent
Diab et al.

(10) Patent No.: US 9,485,077 B2
(45) Date of Patent: Nov. 1, 2016

(54) SYSTEM AND METHOD FOR ENERGY EFFICIENT ETHERNET WITH ASYMMETRIC TRAFFIC PROFILES

(71) Applicant: Broadcom Corporation, Irvine, CA (US)

(72) Inventors: Wael William Diab, San Francisco, CA (US); Mehmet Vakif Tazebay, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 740 days.

(21) Appl. No.: 13/906,956

(22) Filed: May 31, 2013

(65) Prior Publication Data

US 2014/0010130 A1    Jan. 9, 2014

Related U.S. Application Data

(60) Provisional application No. 61/668,690, filed on Jul. 6, 2012.

(51) Int. Cl.
| | |
|---|---|
| *H04L 12/28* | (2006.01) |
| *H04L 5/16* | (2006.01) |
| *H04L 5/14* | (2006.01) |
| *H04J 1/16* | (2006.01) |

(52) U.S. Cl.
CPC . *H04L 5/16* (2013.01); *H04L 5/14* (2013.01); *Y02B 60/43* (2013.01); *Y02B 60/44* (2013.01)

(58) Field of Classification Search
USPC .................. 370/252, 419, 463, 311, 278
See application file for complete search history.

(56) References Cited

U.S. PATENT DOCUMENTS

| | | | | |
|---|---|---|---|---|
| 4,608,688 | A * | 8/1986 | Hansen | G06F 11/1482 714/10 |
| 5,432,775 | A * | 7/1995 | Crayford | H04L 12/40136 370/248 |
| 6,738,359 | B1 | 5/2004 | Watanabe | |
| 2003/0206564 | A1* | 11/2003 | Mills | H04L 12/12 370/528 |
| 2009/0154465 | A1 | 6/2009 | Diab et al. | |
| 2009/0154467 | A1 | 6/2009 | Diab | |
| 2012/0026922 | A1 | 2/2012 | Diab et al. | |
| 2012/0224582 | A1 | 9/2012 | Diab et al. | |

FOREIGN PATENT DOCUMENTS

| | | |
|---|---|---|
| CN | 1229205 A | 9/1999 |
| CN | 101582020 A | 11/2009 |
| KR | 10-1992-0013960 | 7/1992 |

OTHER PUBLICATIONS

KIPO Office Action, Jan. 12, 2015.
Office Action for Chinese Patent Application No. 201310282846.4, dated Mar. 3, 2016, 10 pages.
Office Action for Chinese Patent Application No. 201310282846.4, dated Jul. 22, 2016, 10 pages.

* cited by examiner

*Primary Examiner* — John Pezzlo
(74) *Attorney, Agent, or Firm* — Foley & Lardner LLP

(57) ABSTRACT

System and method for energy efficient Ethernet with asymmetric traffic profiles. A low power mode such as a low power idle mode is typically leveraged when both direction of a link do not have data traffic to transmit. Where only one direction of a link has data traffic to transmit, a physical layer device can transition from a full duplex mode to a simplex mode to produce energy savings (e.g., disabling cancellation circuitry).

20 Claims, 5 Drawing Sheets

SYSTEM AND METHOD FOR ENERGY EFFICIENT ETHERNET WITH ASYMMETRIC TRAFFIC PROFILES

This application claims priority to provisional application No. 61/668,690, filed Jul. 6, 2012, which is incorporated herein by reference in its entirety.

BACKGROUND

1. Field of the Invention

The present invention relates generally to Ethernet networks and, more particularly, to a system and method for energy efficient Ethernet with asymmetric traffic profiles.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the utilization of the network link. For example, many network links are typically in an idle state between sporadic bursts of data. The transmission of idle signals on a link wastes energy and adds to the radiated emission levels. Identification of these frequent low link utilization periods can therefore provide opportunities to produce energy savings.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
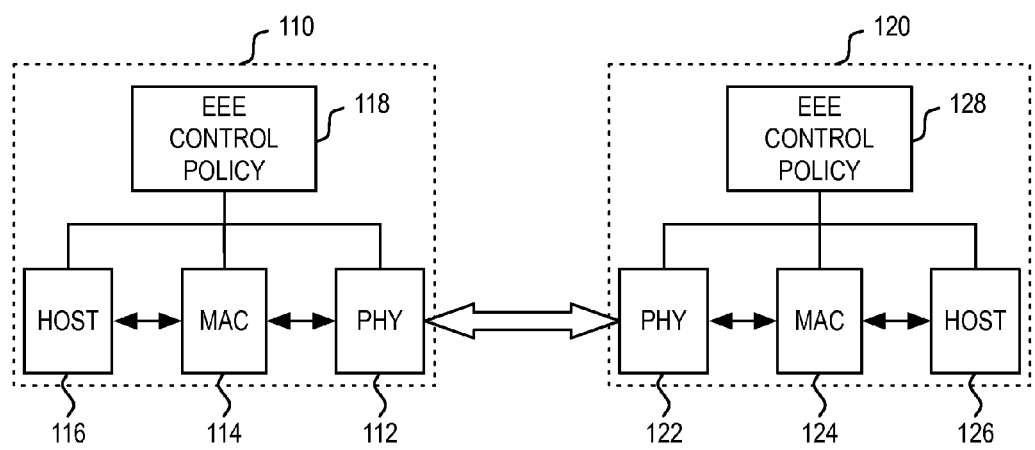
FIG. 1 illustrates an Ethernet link between link partners having energy efficiency control policies that implement an energy efficiency control policy of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy efficient Ethernet networks attempt to save power when the traffic utilization of the network is not at its maximum capacity. This serves to minimize the performance impact while maximizing energy savings. One type of traffic profile that can be encountered by an energy efficiency control policy is an asymmetric traffic profile. In one example, the asymmetric traffic profile can be found in an automotive system context where a first link direction carries video traffic and a second link direction carries infrequent, low-bandwidth status, protocol, diagnostic, and/or control traffic.

Asymmetric traffic profiles can limit the amount of energy savings that can be gained. For example, the existence of traffic in either direction of the link can preclude the energy efficiency control policy from having the link enter into a low power mode such as a low power idle mode. In accordance with the present invention, an energy efficiency control protocol is provided that can increase the amount of energy savings when asymmetric traffic profiles are encountered.

In one embodiment, an energy efficiency method of the present invention can be configured to control the operation of a physical layer device (PHY) in a network device. In one example, the PHY in the network device is initially configured to operate in a full duplex mode where the PHY transmits and receives data on a transmission medium. In various applications, the transmission medium can represent twisted pair cabling, fiber optic cabling, a backplane, etc.

While operating in the full duplex mode, it may be determined by an energy efficiency control policy that a first direction of transmission in the full duplex mode has entered a low link utilization condition. Upon such a determination, the energy efficiency control policy can be configured to initiate a transition of the PHY from the full duplex mode to a simplex mode where the first direction of transmission on the transmission medium is discontinued and the second direction of transmission on the transmission medium continues. Power savings can be achieved in such a simplex mode. For example, echo cancellation, near-end cross talk (NEXT), far-end cross talk (FEXT), alien near-end cross talk (ANEXT), alien far-end cross talk (AFEXT), transmit (TX) DSP, receive (RX) DSP, pre-emphasis, etc. circuitry that is used during the full duplex mode can be disabled, subsections powered down, or usage reduced during operation of the PHY in the simplex mode.

In one embodiment, it may be further determined by the energy efficiency control policy that the second direction of transmission used in the simplex mode has also entered a low link utilization condition. Upon such a further determination, the energy efficiency control policy can be further configured to initiate a transition of the PHY from simplex mode to a low power mode where both the first and second directions of transmission on the transmission medium are discontinued. Such a further transition can be embodied by a low power mode such as a low power idle (LPI) mode. In general, LPI relies on turning the active channel silent in both directions of transmission when there is nothing to transmit. Energy is thereby saved when the link is off. Refresh signals can be sent periodically to enable wake up from the LPI mode.

It is a feature of the present invention that an energy efficiency control protocol can be designed to control state transitions between a full duplex mode, simplex mode, and a low power mode. Here, the full duplex mode represents a transmission mode where both PHYs transmit on a transmission medium (e.g., twisted wire pair, fiber optic cable, backplane, etc.), the simplex mode represents a transmission state where only one PHY transmits on the transmission medium, and the low power mode represents a transmission state where neither PHY transmits on the transmission medium. In operation, the full duplex mode can represent a normal operating state, the simplex mode can represent an operating state where only one of the two PHYs is prepared to enter a low power mode, and the low power mode can represent a low power mode where both PHYs are prepared to enter the low power mode. It is a feature of the present invention that energy savings can be further generated through the deactivation of PHY cancellation circuitry that is used in a full duplex mode, but not needed in the simplex mode.

Prior to describing the details of the usage of the energy efficiency control protocol of the present invention, a description is first provided of an energy efficiency control policy that can be used to implement the invention. At a broad level, the energy efficiency control policy for a particular link in the network determines when to enter an energy saving state, what energy saving state (i.e., level of energy savings) to enter, how long to remain in that energy saving state, what energy saving state to transition to out of the previous energy saving state, whether or not to affect the traffic profile (e.g., coalesce packets, buffer and batch, re-balance traffic, shape traffic, etc.), etc. In one embodiment, energy efficiency control policies can base these energy-saving decisions on a combination of settings established by an IT manager and the properties of the traffic on the link itself.

FIG. 1 illustrates an example link to which an energy efficiency control policy of the present invention can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As illustrated, link partner 110 includes PHY 112, media access control (MAC) 114, and host 116, while link partner 120 includes PHY 122, MAC 124, and host 126.

In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MACs 114 and 124 may provide the necessary services to hosts 116 and 126 to ensure that packets are suitably formatted and communicated to PHYs 112 and 122, respectively. MACs 114 and 124 may comprise suitable logic, circuitry, and/or code that may enable handling of data link layer (Layer 2) operability and/or functionality. MACs 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

As FIG. 1 further illustrates, link partners 110 and 120 also include energy efficiency control policy entities 118 and 128, respectively, which are configured to implement the energy efficiency control protocol of transitions between a full duplex mode, simplex mode and low power mode. In general, energy efficiency control policy entities 118 and 128 can comprise suitable logic, circuitry, and/or code that may be enabled to establish and/or implement an energy efficiency control policy for the network device. In various embodiments, energy efficiency control policy entities 118 and 128 can be a logical and/or functional block which may, for example, be implemented in one or more layers, including portions of the PHY or enhanced PHY, MAC, switch, controller, or other subsystems in the host, thereby enabling energy-efficiency control at one or more layers.

Conventional energy efficiency control protocols can be designed to determine that a low power mode can be entered when both directions of a link have no data to transmit. An example of such a low power mode is an LPI mode, where both transmitters are silent except for short periods of refresh signaling. The use of an LPI mode is in contrast with the conventional transmission of idle signals when there is no data to be sent. As would be appreciated, the transmission of conventional idle signals would consume just as much power as the transmission of data. Another example of a low power mode is a subset PHY mode where one or more channels of a PHY device may be reconfigurable, in real-time or near real-time, to communicate at different data rates.

Figure 2:
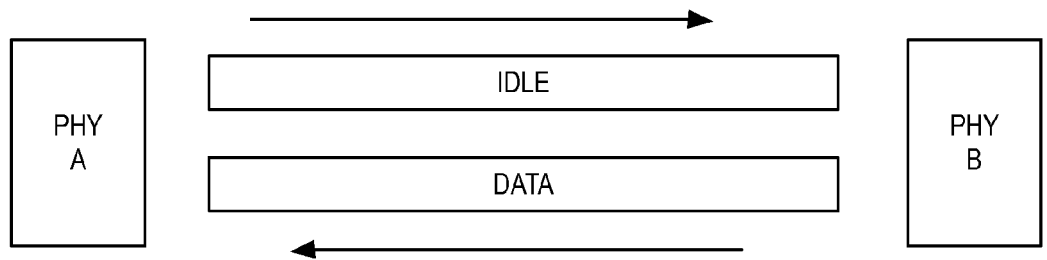
FIG. 2 illustrates signaling between link partners with one-way data.

For link applications such as gigabit Ethernet (1000BASE-T), the appearance of traffic on either end of the link would preclude entry into a low power mode such as the LPI mode. Here, one side of the link would transmit data, while the other side of the link would transmit idle signals. Such a scenario is illustrated in FIG. 2. As this scenario illustrates, the appearance of consistent data on one end of the link would preclude the other end of the link from entering into a low power idle mode.

Figure 3:
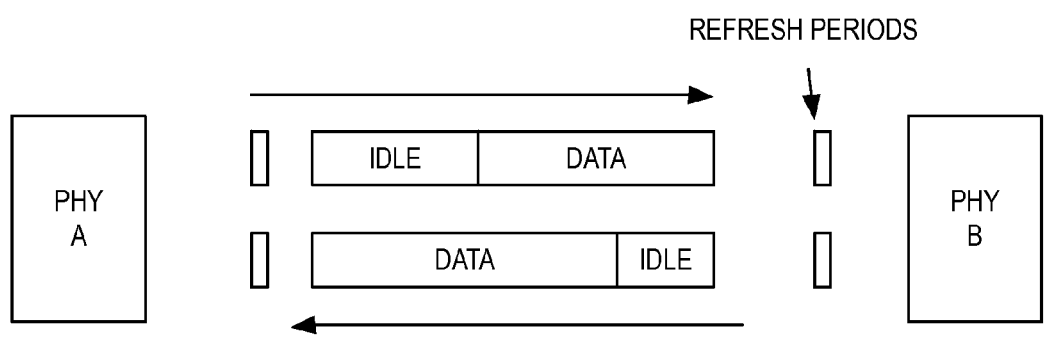
FIG. 3 illustrates usage of low power idle with asymmetric data traffic.

The inefficiencies of such a scenario are inherent to a two-way protocol where the existence of data on either end of the link would preclude the link itself from entering into an low power idle mode. As FIG. 3 illustrates, data sent from either end of the link will not typically appear at the same time. As there is no correlation between the arrival of data on one end of the link with the arrival of data on the other end of the link, the idle state of the link is based on an AND function of the idle availability of both directions of transmission on the link. Thus, even if one side of the link was idle nearly 100% of the time, the existence of traffic on the other side of the link would preclude the realization of energy savings through a low power mode. In the current specification of 1000BASE-T, for example, idle signals are sent during periods when the other side is sending data. The entry into an LPI mode is therefore conditioned on the absence of data to be transmitted in both directions of the link. Such operation is representative of energy efficiency protocols such as 1000BASE-T EEE.

In the present invention, it is recognized that asymmetric traffic profiles can severely limit energy saving opportunities. This is especially true of automotive vehicle networks where most links that relate to sensors, controls, entertainment systems, etc. operate in a very asymmetric way. Another examples of network having asymmetric traffic profiles include audio-video bridging (AVB) networks where streaming traffic is being transmitted (e.g., access networks to the home/business, cellular backhaul, etc.), and control networks where one direction of the link is control information that has a light traffic profile and the other direction of the link is status information that has a heavy traffic profile. Here, it should be noted that these conditions can be dynamic to a user, but look relatively static in terms of network timing. For example, a user using a home PC or device can initiate a movie stream, which lasts for a few hours, then go back to a normal work flow where the traffic profile on the link is entirely different. It is therefore a feature of the present invention that an additional simplex operating mode can be defined for use by the energy efficiency control policy along with a full duplex mode and a low power mode.

Figure 4:
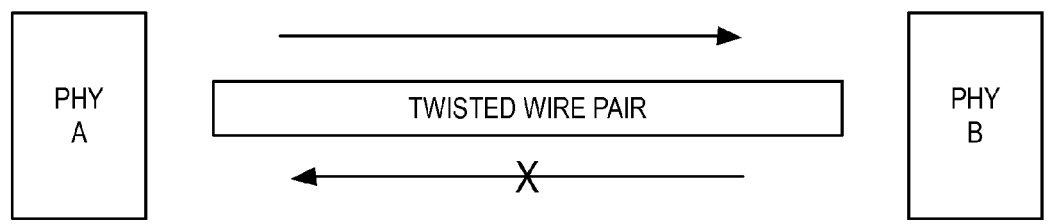
FIG. 4 illustrates an example application to a one-pair Ethernet transmission system.

Here, it should be noted that the simplex mode can be used in the context of any transmission system that uses a full duplex mode of communication. Consider, for example, data transmission (e.g., 100 Mbps, 1 Gbps, or other standard or non-standard speed) over a single twisted wire pair. In this example, a single twisted wire pair would be used for both transmitting and receiving data in a full duplex mode. In the simplex mode, on the other hand, the single twisted wire pair would be used for transmitting data in only one direction. FIG. 4 illustrates such a simplex mode of operation. When operating in such a simplex mode of operation, echo cancellers can be turned off as transmission in only a single direction occurs over the single twisted wire pair.

Figure 5:
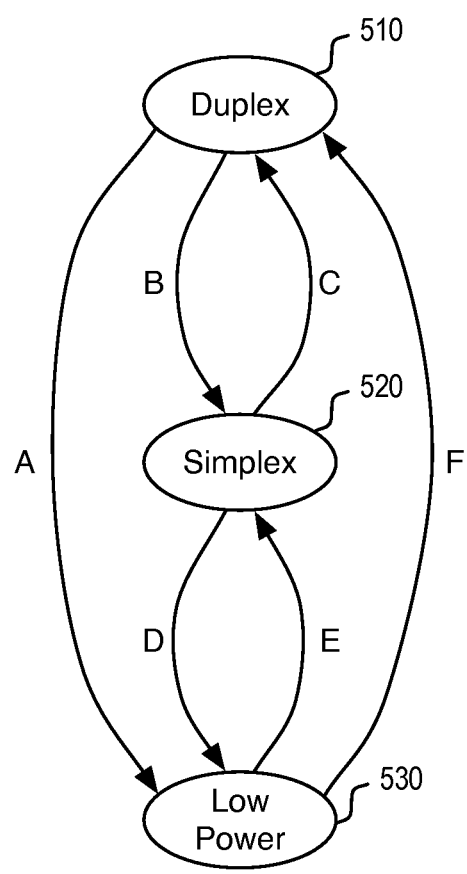
FIG. 5 illustrates a state diagram for use by an energy efficiency control protocol in addressing links with an asymmetric traffic profile.

FIG. 5 illustrates an example state diagram for use by an energy efficiency control protocol of the present invention in addressing links having an asymmetric traffic profile. As illustrated, the state diagram includes full duplex mode 510, simplex mode 520, and low power mode 530 and the corresponding transitions to/from operating modes 510, 520, 530. Full duplex mode 510 can represent a normal operating state where both PHYs on a link are transmitting over the transmission medium (e.g., twisted wire pair(s), fiber optic cable, backplane, etc.). A transition from full duplex mode 510 to low power mode 530 can occur upon transition 'A', where both link partners assert a transition to low power mode 530. As an example, the low power mode can represent a conventional low power mode such as an LPI mode or subset PHY mode. As would be appreciated, the low power mode can represent various forms of subrating on the link that can enable power savings. It should be noted again that the transition from the full duplex mode to the low power mode can be limited to only those instances where neither side has data to transmit at a common point in time. As illustrated in FIG. 3, the existence of data for transmission by either link partner would preclude entry into the low power mode. In one embodiment, simplex-LPI or simplex-subset PHY combination modes can also be included between the simplex mode and the low power mode.

Where an asymmetric traffic profile exists, only one of the link partners may assert a transition to a low power mode, while the other link partner continues with regular traffic transmission on the transmission medium. This scenario can be represented by transition 'B' from duplex mode 510 to simplex mode 520. In this state transition from full duplex mode 510 to simplex mode 520, only one of the PHYs on the link is transmitting on the transmission medium. For example, in a single twisted pair embodiment, only a single PHY is transmitting on the single twisted wire pair. As noted, simplex mode 520 can generate energy savings as one or more of the echo cancellation, NEXT, FEXT, ANEXT, AFEXT, TX DSP, RX DSP, pre-emphasis, etc. circuitry used during full duplex mode 510 can be disabled, subsections powered down, or usage reduced.

Should the same link partner that asserted the transition to the low power mode de-assert such a transition, then a transition from simplex mode 520 back to full duplex mode 510 would occur. This transition is represented by transition 'C' in the state diagram of FIG. 5, where the link would return to a normal operating state.

If, on the other hand, the other link partner asserts a transition to the low power mode while the link is operating in simplex mode 520, then a situation arises where both link partners have asserted such a transition. This represents a scenario where both link partners have no data to transmit. Upon such an occurrence, the energy efficiency control protocol would initiate a transition from simplex mode 520 to low power mode 530. Such a transition is illustrated as transition 'D.'

In one embodiment, the transition between full duplex mode 510 to simplex mode 520 can be conditioned on a waiting period. This waiting period can be designed to detect whether the other direction of transmission is signaling a transition to a low power mode such that a direct transition from full duplex mode 510 to low power mode 530 occurs. This waiting period can remove unnecessary transitions to simplex mode 520 as an intermediate transition to low power mode 530. In one embodiment applied to non-latency sensitive applications, a control policy can choose to buffer traffic to keep it in a particular mode for a prolonged period (e.g., if the transition is to a higher power mode), or to ensure that the change in profile is not permanent (e.g., temporary idle condition where the cost of switching modes would be higher than the energy savings benefit).

While in low power mode 530, if either one of the link partners de-asserts the transition to the low power mode, then a transition can occur from low power mode 530 to simplex mode 520. This transition is represented by transition 'E,' where only one of the PHYs is transmitting on the conductors. Alternatively, if both of the link partners de-assert the transition to the low power mode at a time proximate to each other, then a transition can occur from low power mode 530 to full duplex mode 510. This transition is represented by transition 'F,' where normal operation would resume on the link.

As has been described, the introduction of a simplex mode in addition to the full duplex mode and the low power mode can produce significant energy savings where a link exhibits an asymmetric traffic profile and a conventional low power mode cannot be leveraged by the energy efficiency control protocol.

Figure 6:
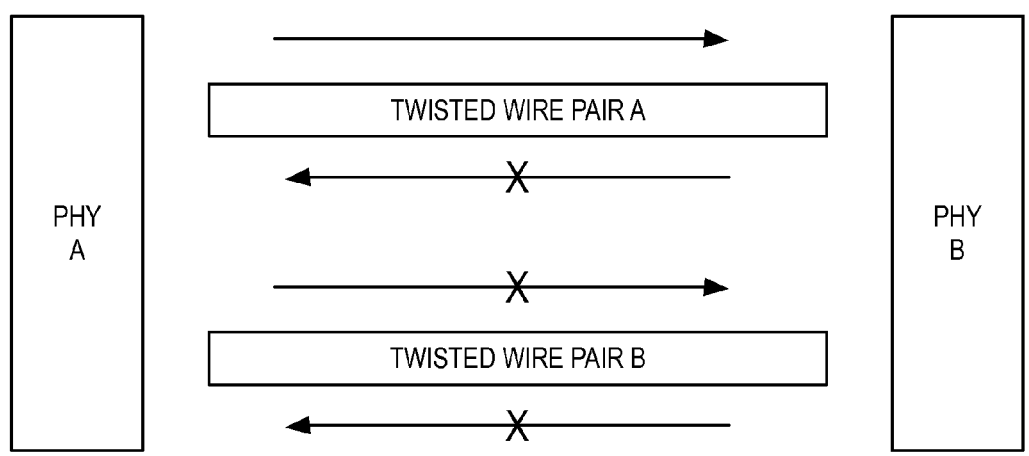
FIG. 6 illustrates an example application to a two-pair Ethernet transmission system.

FIG. 6 illustrates another example application that is applied to data transmission over two twisted wire pairs. In this example, two twisted wire pairs are used in a full duplex mode, wherein each twisted wire pair can be used to send and receive 500 Mbit/s of data. In a simplex mode that occurs, for example, upon link partner B asserting a transition to a low power mode or one direction of the link being disabled or otherwise curtailed, PHY B would no longer transmit on either twisted wire pairs A or B. Additionally, PHY A can be configured to transmit 1 Gbit/s of data on twisted wire pair A, as compared to 500 Mbit/s of data on both twisted wire pairs A and B. As transmission would only occur on one twisted wire pair in a single direction, cross talk cancellers (e.g., NEXT and FEXT) can also be disabled saving additional power.

While the above example represents a scenario where twisted wire pair B is silent, twisted wire pair B can also be used to transmit refresh signals. Additionally, twisted wire pair B can also be used to transmit from PHY B to PHY A at a reduced transmission rate to accommodate a low power subrating mode. Here, the subrating mode can enable a data transmission rate that is substantially less than the nominal data transmission rate of 500 Mbit/s on twisted wire pair B.

The principles of the present invention can be applied to various PHY types (e.g., twisted pair, optical, backplane, etc.), various interface types such as standard wiring or non-standard wiring (e.g., automotive harness and other control networks), shared media and associated interfaces such as EPON, xPON, EPoC, Ethernet over DSL, etc. Additionally, the principles of the present invention can be applied to various standardized and non-standardized data transmission speeds.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    operating a physical layer device in a network device, using circuitry of the network device, in a full duplex mode where the physical layer device transmits and receives data on a single twisted wire pair;
    upon a first determination that a first direction of transmission in the full duplex mode enters a low link utilization condition, transitioning, using the circuitry, the physical layer device from the full duplex mode to a simplex mode where the first direction of transmission on the single twisted wire pair is discontinued;
    disabling cancellation circuitry used by the physical layer device upon the transition to the simplex mode; and
    after the disabling and upon a second determination that the second direction of transmission enters a low link utilization condition, then transitioning, using the circuitry, the physical layer device from the simplex mode to a low power mode where both the first and second directions of transmission on the single twisted wire pair are discontinued.

2. The method of claim 1, wherein the low power mode is a low power idle mode.

3. The method of claim 1, wherein the low power mode is a subset physical layer device mode.

4. The method of claim 1, wherein the physical layer device is a 1000BASE-T physical layer device.

5. The method of claim 1, wherein the physical layer device is a one pair gigabit physical layer device.

6. The method of claim 1, wherein the physical layer device is a two pair gigabit physical layer device.

7. A method, comprising:
    operating a physical layer device in a network device, using circuitry of the network device, in a full duplex mode where the physical layer device transmits and receives data on the same transmission medium;
    transitioning, using the circuitry, the physical layer device from the full duplex mode to a simplex mode, the transition supporting an operating state where one of transmission and reception of data on the same transmission medium is discontinued; and
    disabling cancellation circuitry used by the physical layer device upon the transition.

8. The method of claim 7, wherein the transmission medium is twisted pair cabling.

9. The method of claim 7, wherein the transmission medium is fiber optic cabling.

10. The method of claim 7, wherein the transmission medium is a backplane.

11. The method of claim 7, further comprising transitioning, using the circuitry, the physical layer device from the simplex mode to a low power mode where both transmission and reception of data on the same conductors is discontinued.

12. The method of claim 11, wherein the low power mode is a subset physical layer device mode.

13. The method of claim 11, wherein the low power mode is a low power idle mode.

14. A network device, comprising:
    a physical layer device comprising circuitry that is configured for initial communication over a transmission medium in a full duplex mode; and
    an energy efficiency control policy that is configured to transition the physical layer device, using the circuitry, from the full duplex mode to a simplex mode where one of transmission and reception of data on the transmission medium is discontinued, the energy efficiency control policy being further configured to disable cancellation circuitry used by the physical layer device for at least part of the time that the physical layer device operates in the simplex mode.

15. The network device of claim 14, wherein the transmission medium is twisted pair cabling.

16. The network device of claim 14, wherein the transmission medium is fiber optic cabling.

17. The network device of claim 14, wherein the transmission medium is a backplane.

18. The network device of claim 14, wherein the energy efficiency control policy is further configured to transition the physical layer device, using the circuitry, from the simplex mode to a low power mode where both transmission and reception of data on the same conductors is discontinued.

19. The network device of claim 18, wherein the low power mode is a low power idle mode.

20. The network device of claim 18, wherein the low power mode is a subset physical layer device mode.

* * * * *